United States Patent [19]

Curtin et al.

[11] Patent Number: 4,701,950
[45] Date of Patent: Oct. 20, 1987

[54] TELEPHONE ANSWERING SYSTEM WITH LINE DETECTOR

[75] Inventors: William J. Curtin; Stephen Soto, both of Madison; Steven Krueger, Windsor, all of Wis.

[73] Assignee: Amtel Communications, Inc., Madison, Wis.

[21] Appl. No.: 599,715

[22] Filed: Apr. 12, 1984

[51] Int. Cl.[4] .................. H04M 3/22; H04M 3/50
[52] U.S. Cl. .............................. 379/214; 379/211; 379/213
[58] Field of Search .......... 179/27 FH, 27 FG, 27 D, 179/18 BE, 18 BD, 18 B; 379/213, 214, 210, 211, 212, 266, 265

[56] References Cited

U.S. PATENT DOCUMENTS

| 3,714,378 | 1/1973 | Kimura et al. | 379/212 |
| 4,529,841 | 7/1985 | Andersson et al. | 379/213 |
| 4,603,236 | 7/1986 | Smith et al. | 379/214 |

FOREIGN PATENT DOCUMENTS 0063162  5/1980  Japan .................. 379/211

OTHER PUBLICATIONS

"Telephone Answering Service Does More Than Answer Phones", N. N. Price, *Telephony*, Sep. 11, 1981, pp. 70–72.

*Primary Examiner*—Thomas W. Brown
*Attorney, Agent, or Firm*—Lowe, Price, LeBlanc, Becker & Shur

[57] ABSTRACT

A telephone answering system for use in conjunction with a PBX/CENTREX system for answering incoming calls directed to any of the extension lines within the system. The telephone answering system includes an operator control station and a line detection system. The line detection system monitors the telephone lines within the PBX/CENTREX system. This detection system includes a plurality of ring/hook interfaces each of which is connected in parallel across one of the telephone lines in the PBX/CENTREX system being monitored. Each of the interfaces has a ring detector for detecting a ring signal on the associated telephone line for providing a ring count when there is an incoming call and a hook detector for detecting the on/off hook condition on the associated telephone line. A coupling mechanism couples the ring detector and the hook detector to the operator control station for providing information to the operator control station indicative of the ring count and hook conditions of the telephone lines being monitored. The operator control station is coupled to the detector and provides a signal for causing the PBX/CENTREX system to carry out a directed call pick-up when the ring count on a monitored telephone line has exceeded a preselected limit without the incoming call being answered and for transferring such incoming call to said operator control station for answering by an operator.

14 Claims, 7 Drawing Figures

TELEPHONE ANSWERING SYSTEM WITH LINE DETECTOR

BACKGROUND OF THE INVENTION

The present invention involves a telephone answering system for use in conjunction with a PBX/CENTREX system for monitoring and answering incoming calls from a central office or another PBX/CENTREX extension directed to various telephone extensions within the PBX/CENTREX system.

In order to provide each of the telephone extensions of a PBX/CENTREX system with telephone answering services, a control system has been interconnected between the PBX/CENTREX system and each of the telephone extension lines. This control system is connected in parallel across the tip and ring lines directed to each extension line. This control system monitors each of the incoming calls received on the telephone extension lines and includes a switching matrix for connecting an operator controlled telephone answering system to the tip and ring lines of such an extension when the extension remains unanswered for a preselected number of rings.

In the operation of such a telephone answering system, a tip/ring monitor is placed across each of the extension lines in the PBX/CENTREX system for counting the number of rings on the extension line in the PBX/CENTREX system. A relay switch is then provided for each of the extension lines which enables an incoming call directed to any of the extension lines to be switched from such extension line to a line connected in parallel directed to an operator controlled telephone answering system. When the number of rings on a subscriber line has been counted and exceeds a preselected number of rings without the subscriber answering his telephone, i.e. without the phone going off-hook, the call is then transferred through the switching matrix to the telephone answering service.

This monitoring of each of the telephone lines and switching of a call on such line to a telephone answering service is normally provided through a telephone line concentrator such as the concentrator marketed by the assignee of the present patent application Amtel Communications, Inc. under the name "Little Guy." Such a telephone line concentrator is connected in parallel across each of the telephone lines in the system. Such a concentrator includes a built-in relay switching matrix for connecting the calls from each of the lines to the telephone answering service.

SUMMARY OF THE INVENTION

An object of the present invention is to provide an improved telephone answering system for use in conjunction with a PBX/CENTREX system for monitoring calls directed to the telephone extensions within the PBX/CENTREX system.

Another object of the present invention is to provide a telephone answering system for use in conjunction with a PBX/CENTREX system in which the use of a switching matrix within the telephone answering system is eliminated.

A further object of the present invention is to provide a telephone answering system for use in conjunction with a PBX/CENTREX system which monitors the ring count and hook condition of each of the telephone extension lines within the PBX/CENTREX system and enables calls directed to such extension lines to be answered without the telephone answering system needing to be directly connected through the PBX/CENTREX switching matrix to such extension line.

The telephone answering system of the present invention accomplishes the above listed objectives. The telephone answering system of the present invention is used in conjunction with a PBX/CENTREX system and monitors the incoming calls on each of the telephone extension lines within the PBX/CENTREX system. When the incoming call on a particular line exceeds a predesignated ring count, a message is sent to an operator controlled system that such particular telephone extension line needs to be answered. The operator control system, either through manual operation by the operator or automatically through an auto-dialer activates a directed call pick-up within the PBX/CENTREX system for causing such incoming call to such telephone extension line to be transferred by the PBX/CENTREX system to the operator controlled system. Consequently, unlike in the telephone line concentrator, this telephone answering system does not have an internal switching matrix and never actually answers the call directly on the particular telephone extension line. The elimination of such internal switching matrix removes a substantial hardware cost from the telephone answering system while still enabling efficient telephone answering services to be provided.

The telephone answering system of the present invention includes a line detector for monitoring each of the telephone lines within the PBX/CENTREX system. This line detector normally would be located at the site of the PBX/CENTREX system, while the operator and the operator control system of the telephone answering system may be situated at a location remote from the PBX/CENTREX system. This line detector includes a ring/hook scanner that provides a mechanism for interfacing a common control microprocessor element to a group of telephone lines within the PBX/CENTREX system. The interface mechanism can detect the presence of a valid ring signal on the telephone line being monitored and the hook status of such telephone line, whether the telephone on the line is on or off-hook. A valid ring is defined as the presence of a ring voltage (greater than 80 VAC, 15-60 Hz) for at least 150 msec and the absence of ring voltage for at least 550 msec. The hook status of a line is defined as on-hook when the differential voltage from the tip line to the ring line is greater than 24 volts and off-hook when such differential voltage is less than 24 volts.

In accordance with the preferred embodiment, the ring/hook scanner can include a rack mountable cage which provides a common power supply and a means of interconnection; a common control microprocessor which scans the telephone line status information provided by a plurality of interface boards; and, a group (currently 1-16) of interface boards, each capable of providing ring and hook detection for a multitude (currently 25) of telephone lines. Such an arrangement enables the ring scanner function to be provided for 1-400 lines within the PBX/CENTREX system. Each interface board is identical and is mapped into the address field of the common control microprocessor only by the relative position of the interface board within the rack mountable cage. This insures that the user of the system does not have to provide intervention by setting any switches or jumpers when interchanging multiple interface cards within a system. If the PBX/CENTREX system includes more lines, the number of boards within the ring scanner could be increased.

The output from the microprocessor which is coupled to the line detector supplies information to an operator control system. This information can be provided either by connecting the output of the microprocessor to a video display which is viewed by the operator who operates the operator control system or can be provided from the microprocessor to a computer within the operator control system. When the microprocessor displays a message on the vidio screen of the operator control system, which message indicates that a particular telephone extension line within the PBX/CENTREX system should be answered since the ring count has exceeded the preselected number of rings without the phone being answered, the operator of the system will dial the PBX/CENTREX system with a number indicating that a directed call pick-up should be performed so as to transfer the call on the extension line receiving the call to the operator control system along with a number identifying the particular telephone extension from which the call should be transferred to the operator control system. Alternatively if the microprocessor is connected to a computer within the operator control system, the directed call pick-up operation can be automatically carried out. In this second situation, the computer will automatically dial the PBX/CENTREX directing the PBX/CENTREX to perform a directed call pick-up and identifying the particular telephone extension from which the call should be transferred to the operator control system.

For the purpose of carrying out the automatic activation of the directed call pick-up in response to signals from the microprocessor, the interceptor system disclosed in commonly assigned patent application Ser. No. 579,530 filed Feb. 13, 1984, now U.S. Pat. No. 4,629,831 issued Dec. 16, 1986 to Curtin et al can be utilized; the subject matter of said patent application is hereby incorporated by reference. If such an interceptor as disclosed in this commonly assigned patent application is utilized, the microprocessor of such interceptor can serve the dual purpose of operating such interceptor or can act as the microprocessor that is connected in series with the operator line and can automatically perform the directed call pick-up.

DESCRIPTION OF THE PREFERRED EMBODIMENT

Figure 1:
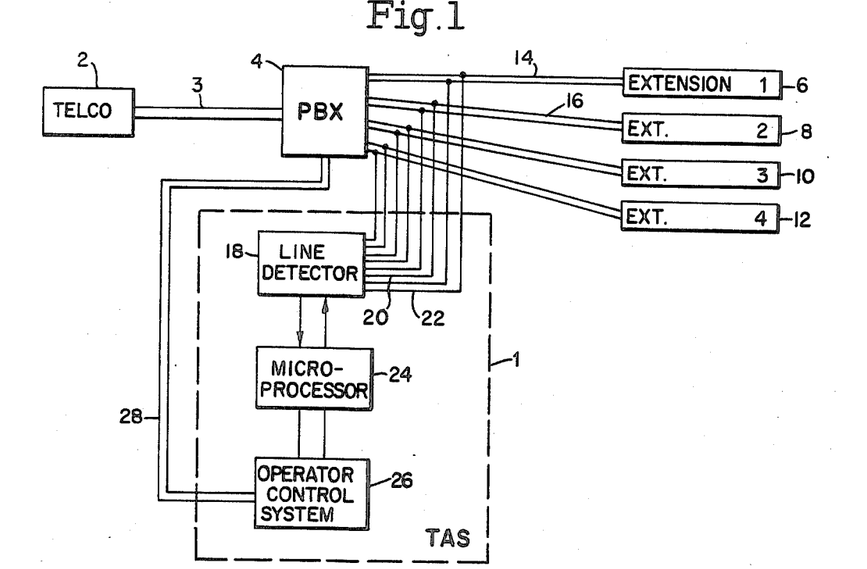
FIG. 1 is a overall box diagram of the telephone answering system of the present invention in use in conjunction with a PBX/CENTREX system in accordance with the present invention.

The telephone answering system 1 as shown in FIG. 1 is used in conjunction with a PBX/CENTREX system 4. The PBX/CENTREX system receives incoming calls from TELCO 2 through a trunk line 3, which can and often would be a DID trunk line. The incoming calls are routed by the PBX/CENTREX to the various telephone extensions within the system such as telephone extensions 6, 8, 10 and 12. These telephone extensions are connected to the PBX/CENTREX system through pairs of ring and tip lines such as lines 14 and 16.

The telephone answering system 1 includes a line detector 18 that is connected to each of the ring and tip lines for each of the telephone extensions. Thus, lines 20 and lines 22 connect the line detector to lines 16 and 14, respectively. Line detector 18 includes a plurality of ring/hook monitoring circuits (detectors), each of which is connected in parallel across the ring and tip lines directed to one of the telephone extensions with the PBX/CENTREX system. Thus, line detector 18 is capable of monitoring the ring and hook conditions of each of the telephone extensions within the PBX/CENTREX system. Line detector 18 also includes a plurality of buffer and control members for storing information about the ring and hook conditions of each of the telephone lines within the PBX/CENTREX system and enabling each of the buffers to be addressed for reading out information stored in the buffers regarding the ring and hook conditions of each of the telephone lines within the system.

The operation of line detector 18 is controlled by a microprocessor circuit 24. Microprocessor 24 provides enabling signals for addressing each of the buffers within line detector 18 and enabling the reading out of the information within the buffers, which information indicates the ring and hook conditions of each of the telephone lines within the system. The microprocessor then counts the number of rings that have occurred on each of the telephone lines and when such count has exceeded a preselected number and the telephone has not yet been answered, i.e. the telephone has not gone off-hook, then the microprocessor provides a signal indicating that such telephone extension needs to be answered by the operator.

Figure 2:
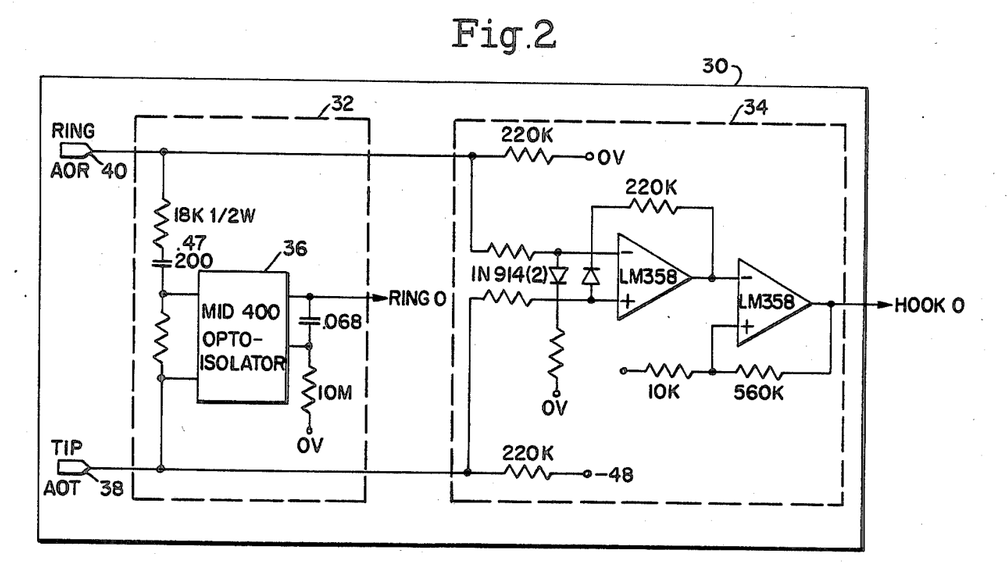
FIG. 2 is a schematic diagram of a ring/hook detection circuit for use in conjuction with the present invention.

A plurality of ring/hook detection circuits, such as detection circuit 30 shown in FIG. 2, are provided. In accordance with the preferred embodiment, 25 detection circuits are provided on each interface board, which interface board then is coupled to the control and buffer circuits shown in FIGS. 3A and 3B. A plurality of such interface boards such as up to 16 boards in accordance with the preferred embodiment are provided so that the line detector can monitor up to 400 telephone lines within a PBX/CENTREX system.

Each of the detection circuits 30 includes a ring detector 32 and a hook condition detector 34. Each of the detection circuits 30 are identical and each such detection circuit is connected across the ring and tip lines associated with one of the telephone extensions within the PBX/CENTREX system.

Detection circuit 30 acts as an interface between the analog world of the telephone line and the digital world of the common control microprocessor. Ring detector 32 provides an optically coupled ring detect circuit that insures absolute electrical isolation between the analog and digital worlds. The MID-400 opto-isolator 36 is connected across a resistor which is part of a series R-C-R connection from the tip line 38 to ring line 40 of the telephone extension line. These tip and ring lines are connected in parallel with the telephone extension line.

When a ring voltage is present, the light emitting diode within the MID-400 opto-isolator optically couples that information to one of the buffers within the control and buffer section of the line detector which then supplies the information to the microprocessor 24 when the buffer is addressed by the microprocessor.

Hook condition detector 34 uses operational amplifiers to provide a voltage comparison with the hysteresis between an on-card provided reference and the differential tip-to-ring telephone line voltage. By biasing the tip-ring circuit with two 220 K ohm resistors, an ambient reverse condition is created which allows the determination of the connection of a working telephone line of correct polarity. Consequently if there is no telephone line connection, a reverse polarity connection, the off-hook condition of a parallelly connected telephone line will cause deactivation of the circuit.

Figure 3A:
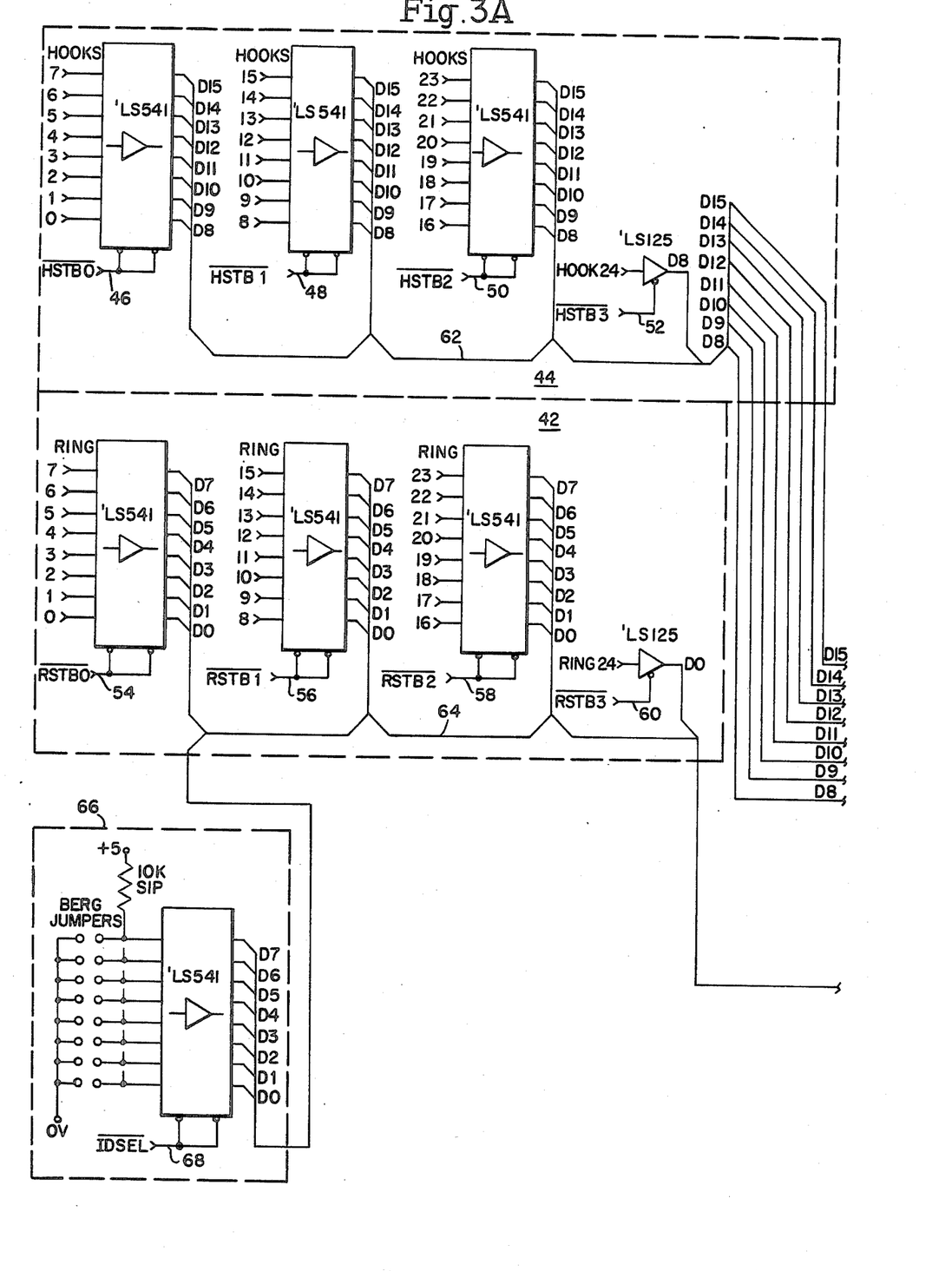
FIGS. 3A and 3B are schematic circuit diagrams of a control circuit of the line detector used in accordance with the present invention.
Figure 3B:
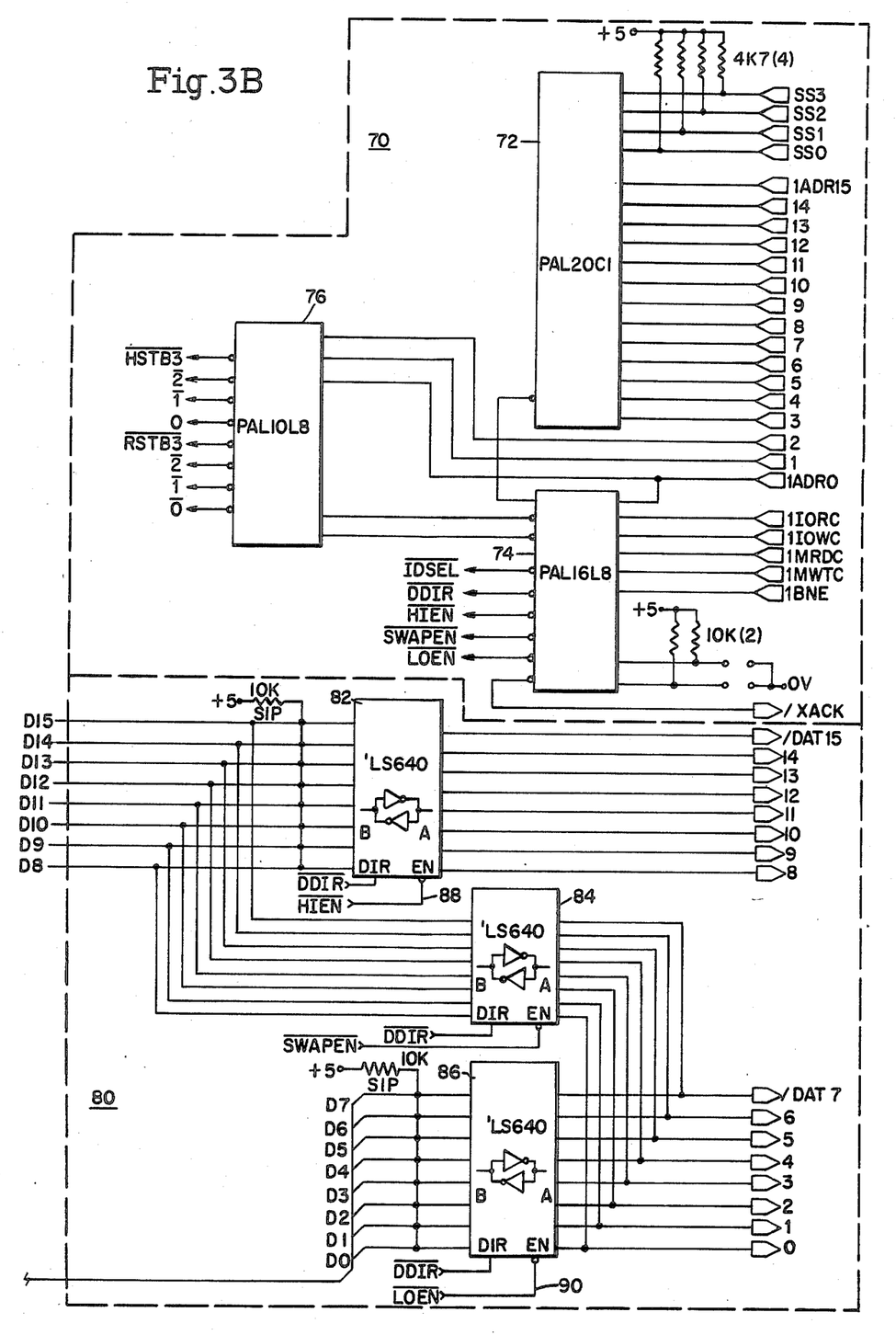

The outputs from the ring detectors and hook condition detectors are supplied to a series of buffers within ring buffer circuit 42 and hook condition buffer circuit 44. The ring detector signal such as Ring 0 from detector 32 is supplied to one of the buffers within ring buffer circuit 42. Similarly the output from the hook condition detector such as output Hook 0 from detector 34 is supplied to one of the buffers within hook condition buffer circuit 44.

Hook condition buffer circuit 44 provides an interface between the multitude of on-board hook detection circuits and the data bus that is connected to the microprocessor through three 74LS541 octal tristate buffers, which provide buffers for a total of 24 circuits, and one section of a 74LS125 tristate buffer which provides a buffer for the 25th hook detection circuit. Ring buffer circuit 42 provides a similar interface between the multitude of ring detection circuits and the data bus to the microprocessor through three 74LS541 octal tristate buffers and one section of a 74LS125 tristate buffer. When an enabling signal is supplied to one of the terminals 46, 48, 50 or 52 of the hook condition buffers and to one of the terminals 54, 56, 58 and 60 of the ring buffers, the particular buffers receiving such signals are activated so that the information within these buffers is read out onto common lines, lines 62 and 64. The information read out of the particular buffer which is activated is then supplied to an output control circuit for transfer to the microprocessor.

A code input circuit 66 is coupled to the data line 64 of the ring buffer circuit. This code input circuit provides a mechanism of interfacing eight on-board user definable jumpers through the data line 64 to be coupled to the microprocessor so as to allow the microprocessor to read user determined information about the configuration status of the ring/hook scanner interface board. This code input circuit includes a set of eight jumpers which can be selectively coupled to various inputs of the octal tristate buffer 74LS541. The information then is read out of this buffer when the buffer is activated by an enabling signal on line 68. For example, this makes it possible to depopulate the card for special applications and inform the microprocessor of the special custom configuration of the card.

The input controls to the ring buffers and hook condition buffers are provided through an input control section 70. This input control section provides on board address decoding and control signal generation for each of the buffers. The microprocessor bus is conditioned by a request for an input/output operation within the allowable address range of the interface card by the PAL20C1 device to provide several discreet control strobes for controlling the operation of the buffers in ring and hook condition buffers 44 and 42. The inputs to the PAL20C1, circuit 72, are provided through the series of input lines shown on the right-hand side of the buffer in FIG. 3. The top set of input lines, SS0, SS1, SS2 and SS3, are select signals. These 550–553 lines are a 4-bit code unique to each card position within a rack mountable cage. They are not provided by the microprocessor. The coded output provides a coded signal for selecting one out of the 16 cards for activation so as to supply information to the microprocessor. The address lines /ADR3 through /ADR15 (/ designates active-low signals) are host address bus lines from the microprocessor. The output from circuit 72 is supplied to control bus interface 74, which is a PAL16L8 device, which serves as a control bus interface. The inputs to control bus interface 74 shown on the right-hand side of the circuit are interfaces to the control bus of the microprocessor. In addition, circuit 74 can receive a two bit coded input through berg jumpers shown on the bottom right side of the circuit. The top two outputs from circuit 74 are an 8-$\overline{16}$, which provides an output signal so as to inform the next chip whether the circuit is being operated in an 8-bit or 16-bit mode, which depends on whether the microprocessor is an 8-bit or 16-bit microprocessor. The second output signal designated as $\overline{EN}$ is an enabling signal. These two output signals are provided to the PAL10L8 device, circuit 76. Circuit 76 also receives enabling signals on the three address lines shown on the right-hand side of the circuit. The outputs from circuit 76 are directed to the ring and hook buffers. The top four outputs are directed to individual ones of the hook buffers for providing enabling signals to such buffers and the bottom four outputs are connected to the ring buffers for providing enabling signals. Circuit 74 includes four additional outputs; the top two outputs are direction indicators, the next three outputs provide enabling signals to the data bus buffers and the bottom output ($\overline{XACK}$) provides an output for acknowledging the transfer of data to/from the selected card to the common control microprocessor.

When the buffers within buffer circuits 42 and 44 are addressed so that information is read out of the activated buffer, the information is supplied to the output control circuit 80. This output control circuit provides an interface between the on-board data bus and the microprocessor data bus via three 74LS640 bidirectional octal buffers, 82, 84 and 86. The middle octal buffer 84 also provides a "byte swap" mechanism by which a 16-bit microprocessor can read the 8-bit byte data from both the top and bottom halves of the designated 16-bit wide word locations, thus providing maximum flexibility in software design. The other two bidirectional actal buffers, 82 and 86, receive input signals from hook bus line 62 and ring bus line 64, respectively. The outputs from bidirectional octal buffers 82 and 86 are provided to the data bus line that extends to the microprocessor when the buffers receive an activating signal on input lines 88 and 90, respectively.

Figure 4:
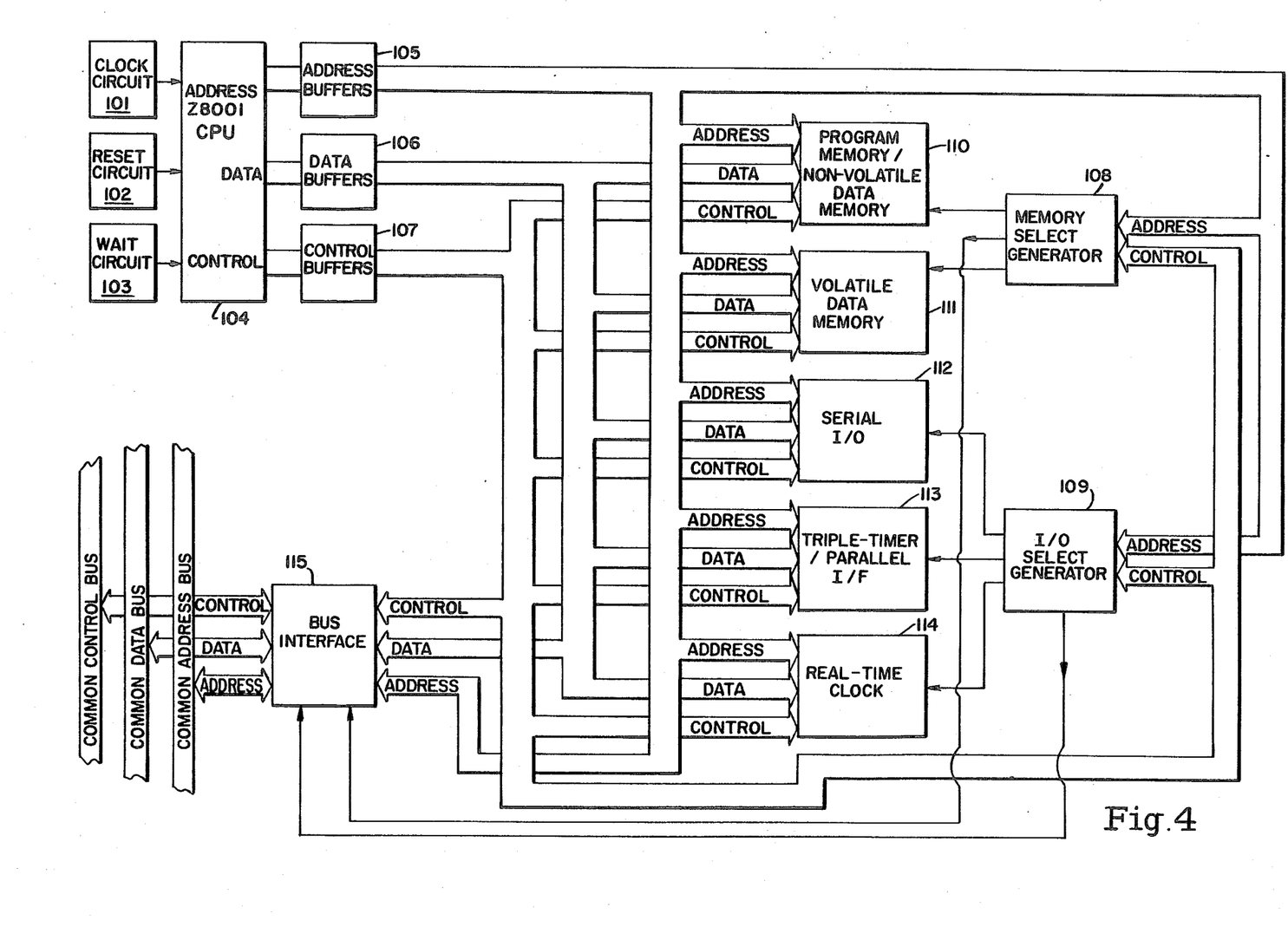
FIG. 4 is a box diagram of the microprocessor circuit used in conjunction with the telephone answering system of the present invention.
Figure 5A:
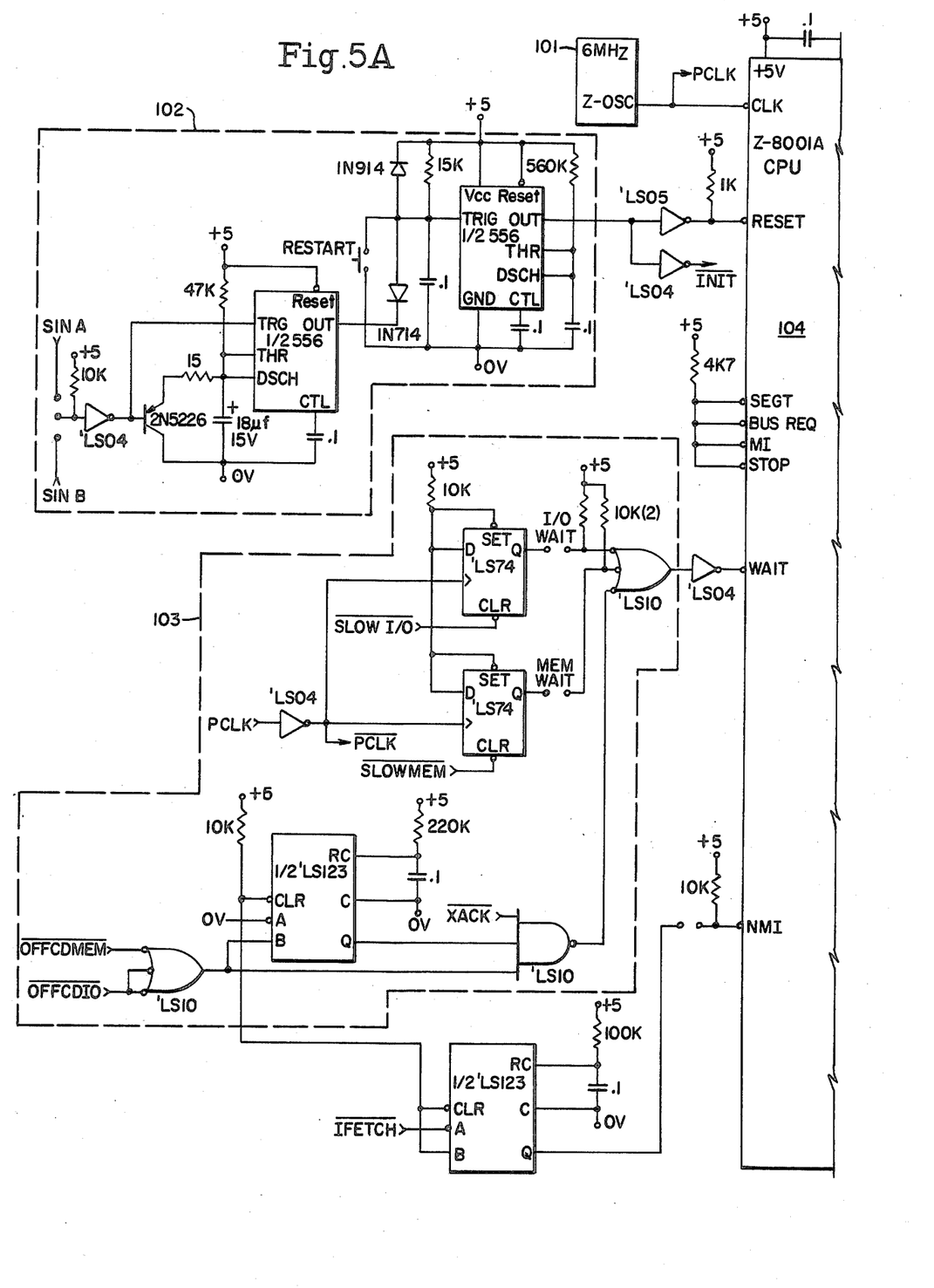
FIGS. 5A and 5B are schematic circuit diagrams of the main sections of the microprocessor circuit shown in FIG. 4.
Figure 5B:
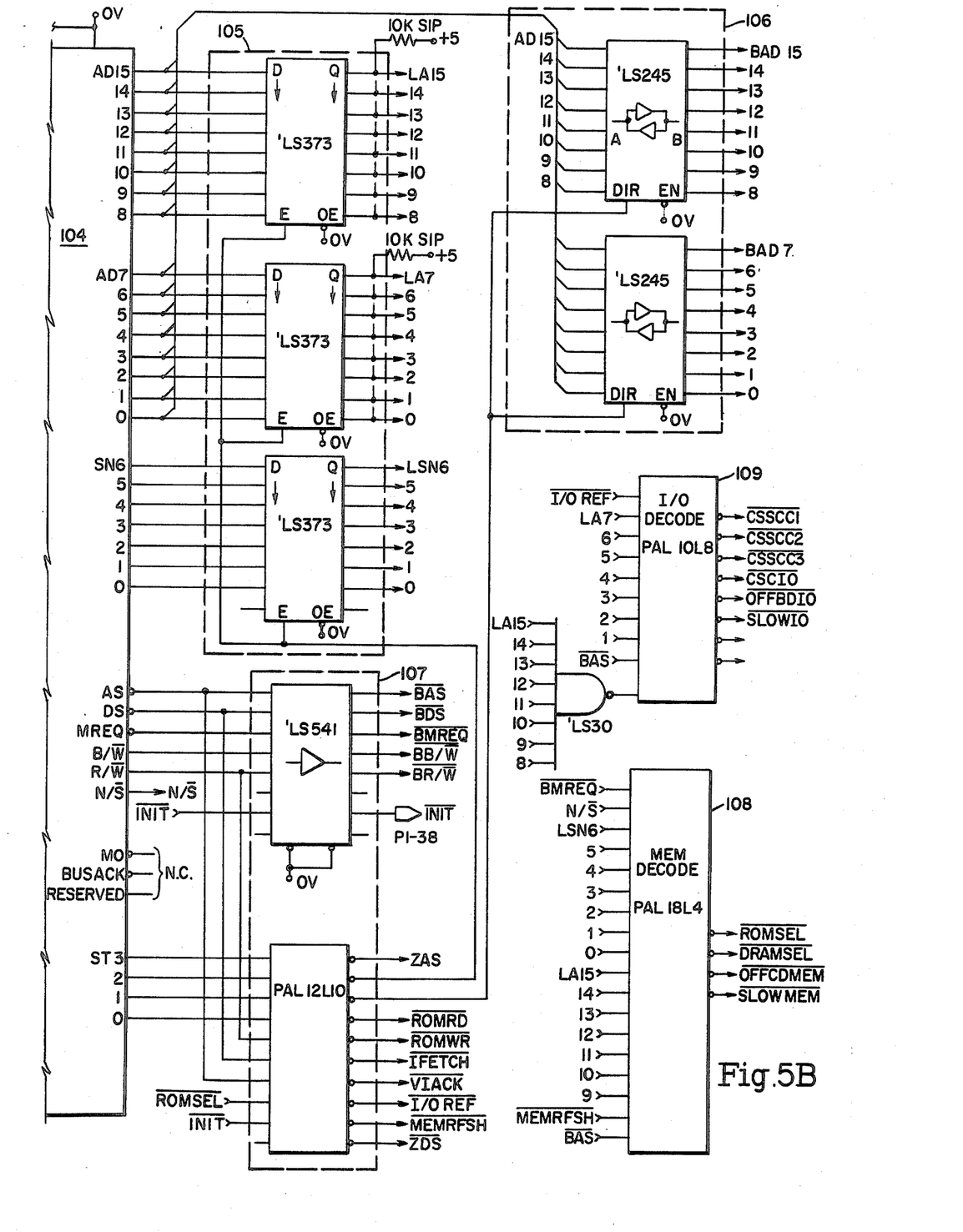

The microprocessor control 24 is shown in FIGS. 4, 5A and 5B. FIG. 4 sets forth a general box diagram of the microprocessor control circuit and FIGS. 5A and 5B are schematic diagrams of the main components of the microprocessor. The microprocessor that is used is a standard type of microprocessor. The particular microprocessor of the preferred embodiment relies upon a 16-bit Z-8001A central processing unit and uses up to 64K of EPROM or RAM. This microprocessor is coupled to all of the 16 interface cards within line detector 18 as well as to the operator control system through a serial input/output section.

The microprocessor includes the central processing unit 104 which is fed by inputs from a clock circuit 101, a reset circuit 102 and a wait circuit 103. The microprocessor also has input and output terminals coupled to address buffers 105, data buffers 106 and control buffers 107. These buffers are coupled to a program memory/- non-volatile data memory 110, a volatile data memory 111, a serial input/output circuit 112, a triple-timer/parallel interface 113, a real time clock 114 and a bus interface 115. The address and control buffers also are connected to a memory select generator 118 and an input-/output select generator 119. Details of the main components of these sections of the microprocessor circuit are shown in FIGS. 5A and 5B.

The semiconductor, integrated circuit (IC) and opto-isolator and the like component designations used herein, such as, for example 74LS541, 74LS125, PAL20C1, PAL16L8, PAL10L8 and MID-400 are generic designations known to those skilled in the art and generally obtainable from multiple manufacturers. The opto-isolator designation MID-400 is generic and obtainable from General Instruments. The 74LS series designations are generic and obtainable from Fairchild, Texas Instruments, Intelco and others. The PAL programmable array logic device designations are generic and obtainable from Monolithic Memories, Inc., Advanced Micrologic Devices (AMD), Texan Instruments and others. As those designation are repeated in the drawings they are at times abbreviated for considerations of space. Thus 74LS541 appears as 'LS541, 74LS125 appears as 'LS125, etc.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the means and ranging of equivalency of the claims are therefore intended to be embraced therein.

What is claimed is:

1. A telephone answering system for use in conjunction with a PBX/CENTREX system, said telephone answering system comprising:
    an operator control means;
    a line detection system for monitoring the telephone lines within the PBX/CENTREX system, said detection system including:
    a plurality of ring/hook interface means, each being connected in parallel across one of the telephone lines in the PBX/CENTREX system being monitored, each said interface means including ring detection means for detecting a ring signal on the associated telephone line for providing a ring count when there is an incoming call and hook detection means for detecting the on/off hook condition on the associated telephone line; and
    coupling means for coupling said ring detection means and said hook detection means to said operator control means for providing information to said operator control means indicative of the ring counts and hook conditions of the telephone lines being monitored;
    said operator control means being coupled to said detection system and including means for causing the PBX/CENTREX system to carry out a directed call pick-up when the ring count on a monitored telephone line has exceeded a preselected limit without the incoming call being answered and for transferring such incoming call to said operator control means for answering by an operator.

2. A telephone answering system according to claim 1 wherein said detection system further includes data buffer means coupled to the outputs of said ring/hook interface means for receiving the ring counts and hook conditions of the telephone lines being monitored and said telephone answering system further comprising microprocessing means coupled to said detection system for both supplying control signals to said detection system for selectively enabling information to be read out of said data buffer means and receiving information read out of said data buffer means and said microprocessing means processing the ring count and hook condition information for providing informational signals to said operator control means when a monitored telephone line should be answered by an operator.

3. A telephone answering system according to claim 2 wherein said ring detection means include opto-isolator means coupled across the tip and ring lines of a telephone line being monitored and said hook detection means include a voltage comparator coupled across the tip and ring lines of a telephone line being monitored.

4. A telephone answering system according to claim 3 wherein said detection system includes input control means coupled to said microprocessing means for controlling the operation of said detection system.

5. A telephone answering system according to claim 4 wherein said detection system includes output control means coupled to said microprocessing means for providing information to said microprocessing means regarding ring counts and hook conditions detected by said ring detection means and said hook detection means.

6. A telephone answering system according to claim 5 wherein said data buffer means includes ring count buffer means coupled to outputs of said ring detection means and hook condition buffer means coupled to outputs of said hook detection means.

7. A telephone answering system according to claim 6 wherein said ring count buffer means and said hook condition buffer means each include a plurality of octal-tristate buffers each of which provides a series of output information when receiving an enabling signal from said input control means.

8. A telephone answering system according to claim 7 wherein said output information from said ring count buffer means and said hook condition buffer means is supplied to said output control means and said output control means supplied such information to said microprocessing means.

9. A telephone answering system for use in conjunction with a PBX/CENTREX system, said telephone answering system comprising:
    an operator control means;
    a line detection system for monitoring the telephone lines within the PBX/CENTREX system, said detection system including:
    a plurality of ring/hook interface means, each being connected in parallel across one of the telephone lines in the PBX/CENTREX system being monitored, each said interface means including ring detection means for detecting a ring signal on the associated telephone line for providing a ring count when there is an incoming call and hook detection means for detecting the on/off hook condition on the associated telephone line; and coupling means for coupling said ring detection means and said hook detection means to said operator control means for providing information to said operator control means indicative of the ring counts and hook conditions of the telephone lines being monitored;

said operator control means being coupled to said detection system and including means for causing the PBX/CENTREX system to carry out a directed call pick-up when the ring count on a monitored telephone line has exceeded a preselected limit without the incoming call being answered and for transferring such incoming call to said operator control means for answering by an operator; and, microprocessng means coupled to said detection system for both supplying control signals to said detection system for selectively enabling ring count and hook condition information to be read out of said detection system and receiving such information read out of said detection system and said microprocessing means processing the ring count and hook condition information for providing informational signals to said operator control means when a monitored telephone line should be answered by an operator.

10. A telephone answering system according to claim 9 wherein said detection system includes input control means coupled to said microprocessing means for controlling the operation of said detection system.

11. A telephone answering system according to claim 10 wherein said detection system includes output control means coupled to said microprocessing means for providing information to said microprocessing means regarding ring counts and hook conditions detected by said ring detection means and said hook detection means.

12. A telephone answering system according to claim 11 further comprising data buffer means including ring count buffer means coupled to outputs of said ring detection means and hook condition buffer means coupled to outputs of said hook detection means.

13. A telephone answering system according to claim 12 wherein said ring count buffer means and said hook condition buffer means each include a plurality of octal-tristate buffers each of which provides a series of output information when receiving an enabling signal from said input control means.

14. A telephone answering system according to claim 13 wherein said output information from said ring count buffer means and said hook condition buffer means is supplied to said output control means and said output control means supplies such information to said microprocessing means.

* * * * *